United States Patent [19]

Mayer

[11] Patent Number: 4,614,353

[45] Date of Patent: Sep. 30, 1986

[54] STORAGE ASSEMBLY FOR TRAILER HITCH TORSION BARS

[75] Inventor: Edward F. Mayer, San Jose, Calif.

[73] Assignee: Forems, Inc., Novelty, Ohio

[21] Appl. No.: 737,325

[22] Filed: May 23, 1985

[51] Int. Cl.[4] ............................................. B60D 1/14
[52] U.S. Cl. .............................. 280/406 A; 280/446 B
[58] Field of Search ........... 280/406 A, 406 R, 405 R, 280/405 A, 405 B, 446 B; 211/96; 248/289 R, 314, 315

[56] References Cited

U.S. PATENT DOCUMENTS 2,924,463  2/1960  Livermont .................. 280/406 A X
3,451,695  6/1969  Tomen ....................... 280/406 A X
4,275,897  6/1981  Moyer .......................... 280/406 A Primary Examiner—John J. Love
Assistant Examiner—Mitchell J. Hill
Attorney, Agent, or Firm—Flehr, Hohbach, Test, Albritton & Herbert

[57] ABSTRACT

A storage assembly for trailer hitch torsion bars mounted on the trailer tongue having a pocket for receiving the greased tip of the torsion bar and a bracket for supporting the bar in the pocket.

4 Claims, 6 Drawing Figures

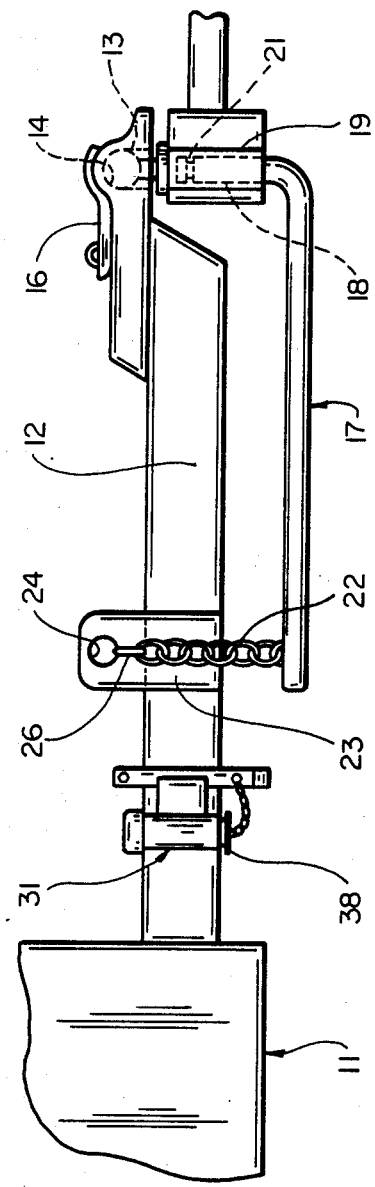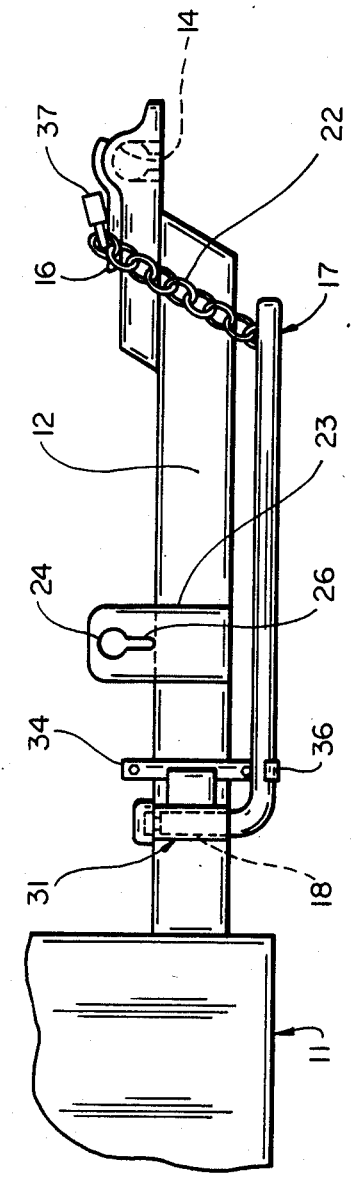

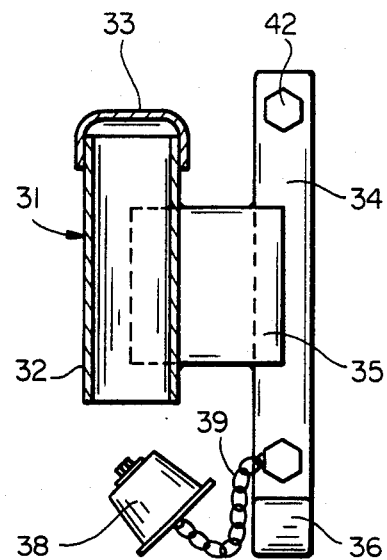
FIG_3
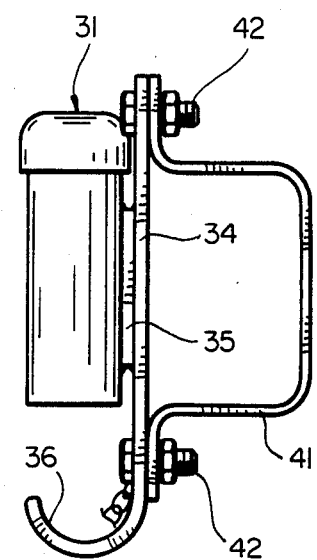
FIG_4
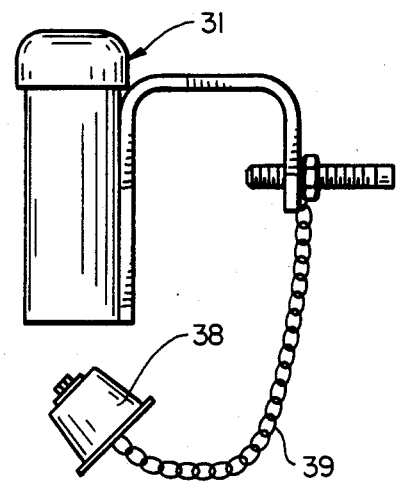
FIG_5
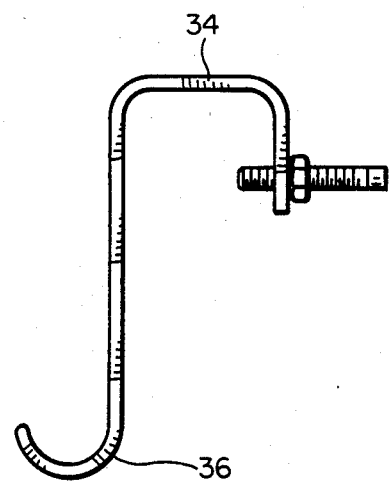
FIG_6

STORAGE ASSEMBLY FOR TRAILER HITCH TORSION BARS

This invention relates to a storage assembly for trailer hitch torsion bars.

Trailer hitch torsion bars are heavy. The tip end which engages the hitch is coated with grease. When a trailer is unhitched from the towing vehicle, the removed torsion bar must be stored. Storage is generally messy because of the grease on the bar. Also, care must be taken to store the bar in a clean place to prevent contamination of the grease. With these requirements in mind, the torsion bar is not generally stored in a convenient location.

It is an object of the present invention to provide a storage assembly for trailer torsion bars.

It is another object of the invention to provide a storage assembly which is disposed near the trailer hitch.

It is still another object of the present invention to provide a trailer torsion bar storage assembly which protects the greased end to minimize contamination and smearing of the grease.

It is a further object of the present invention to provide a device which can be mounted on the tongue of the trailer.

The foregoing and other objects of the invention are achieved by an assembly which can be mounted on the tongue of the trailer and which includes a pocket for receiving the greased tip of the torsion bar and a support bracket into which the torsion bar may be rotated and supported.

The invention will be more clearly understood from the following description taken in connection with the accompanying drawings of which:

FIG. 1 is a side elevational view of a portion of a trailer with the torsion bar mounted between the trailer hitch and trailer tongue.

FIG. 2 is an elevational view showing a portion of a trailer with the torsion bar mounted on the tongue.

FIG. 3 is an enlarged front elevational view of the storage assembly of the present invention including a tip cover and support bracket.

FIG. 4 is a side elevational view of the storage assembly shown in FIG. 3.

FIG. 5 is an alternative construction of the tip cover.

FIG. 6 is an alternative construction of the support bracket.

Referring to FIG. 1, a portion of a trailer 11 is shown with its tongue 12 attached to trailer hitch ball 13 by the socket 14 and latch 16. The torsion bar 17 has its tip end 18 extending into a socket 19. As shown in dotted line, the tip 18 has a groove 21 which cooperates with a spring loaded retainer (not shown) to hold the torsion bar in the socket. The tip 18 of the bar is generally greased for ease of insertion and to permit rotation. Torsion is applied by lifting the chains 22 attached to the end of the torsion bar 17 and engaging it with the retainer 23 attached to the trailer tongue. The retainer 23 includes an enlarged opening 24 through which the chain is inserted and an elongated slot 26 which receives one of the links and serves to lock the chain in place. Tension can be adjusted by lifting the chain to apply more tension to the torsion bar.

Referring to FIG. 2, the torsion bar 17 is shown with its greased tip end 18 inserted in a suitable protective pocket or cover 31. The pocket may be a cylindrical cup formed of a short cylindrical section of pipe 32 with a cap 33. The cup receives the greased end 18. The mounting assembly also includes a bracket 34 which has a lower hook 36. The bracket 34 is secured to the tongue 12 by means of U-clamp and retaining bolts as will be presently described. To store the torsion bar, the tip end 18 is inserted in the pocket and the bar is rotated whereby the elongated end of the bar is rotated into and supported by the hook 36. To prevent theft of the torsion bar, the chain 22 may be locked to the latch 16 by lock 37.

Thus, the torsion bar is retained adjacent on the trailer tongue and readily available for attachment to the trailer hitch. The greased end is protected since it is inserted into the clean pocket 31 and the bar is retained by the hook 36.

The torsion bar storage assembly is shown in more detail in FIGS. 3 and 4. The pocket or cover is shown in section with the cylinder 32 and cap 33. The pocket is secured to the bracket 34 by welding the pocket to a plate 36 which is then welded to the bracket 34. It is apparent that the bracket could be formed as a single piece having an extending tongue to which the cylinder can be welded or attached. To prevent contamination of the pocket when the torsion bar is removed, a plug 38 attached to a chain 39 is secured to the bracket 34. The plug is inserted into the open end of the pocket to thereby seal the pocket when not in use.

The storage assembly is secured to the trailer tongue by means of a U-shaped bracket 41 which is bolted to the bracket 34 by bolts 42.

FIGS. 5 and 6 show an alternative construction of the storage assembly. In this configuration the assembly is separated into two parts, a tip cover 31 and a support bracket 34. The tip cover and support bracket include a U-shaped bracket 46 designed to hook over the trailer tongue member and are secured to the tongue with a set screw 47.

Although there has been described a trailer with a single tongue, it is apparent that the bracket can be used on each of multiple tongues when more than one torsion bar is used. The pocket or cover 31 need not be cylindrical but can be of other shapes. It need only accommodate the greased end.

Thus, the retaining assembly is simple in construction, easy to install on the trailer tongue, and provides convenient accessability to the torsion bar.

What is claimed is:

1. A storage assembly for trailer torsion bars of the type having an elongated arm with a greased tip end adapted to engage the trailer hitch and the other end adapted to be secured to the trailer tongue for applying torsion to the trailer hitch, said assembly comprising a pocket having a downwardly facing open end for receiving the upwardly extending greased tip end of the torsion bar, a support into which the arm is rotated after insertion in the pocket to support the bar, and means for securing the assembly to the trailer tongue.

2. A storage assembly for trailer torsion bars as in claim 1 in which the pocket and support are a unitary structure and the means for securing the assembly to the trailer tongue comprises a single clamp.

3. A storage assembly for trailer torsion bars as in claim 1 in which the means for securing the assembly to the trailer tongue comprises a clamp associated with each of said pocket and support.

4. A storage assembly for trailer torsion bars of the type having an elongated arm with a greased tip end adapted to engage the trailer hitch and the other end adapted to be secured to the trailer tongue for applying torsion to the trailer hitch, said assembly comprising a pocket having an open end for receiving the greased tip end of the torsion bar, removable means for closing the open end of said pocket, a support into which the arm is rotated after insertion in the pocket to support the bar, and means for securing the assembly to the trailer tongue.

* * * * *